US007357318B2

(12) United States Patent
Honda

(10) Patent No.: US 7,357,318 B2
(45) Date of Patent: Apr. 15, 2008

(54) RFID TAG ACCESS AUTHENTICATION SYSTEM AND RFID TAG ACCESS AUTHENTICATION METHOD

(75) Inventor: Hajime Honda, Kumamoto (JP)

(73) Assignee: Honda Motor Co., Ltd., Tokyo (JP)

( * ) Notice: Subject to any disclaimer, the term of this patent is extended or adjusted under 35 U.S.C. 154(b) by 417 days.

(21) Appl. No.: 10/944,525

(22) Filed: Sep. 17, 2004

(65) Prior Publication Data

US 2005/0061879 A1 Mar. 24, 2005

(30) Foreign Application Priority Data

Sep. 19, 2003 (JP) ............................ 2003-328950

(51) Int. Cl.

| | |
|---|---|
| ***G06F 19/00*** | (2006.01) |
| ***G06Q 30/00*** | (2006.01) |
| ***G06Q 90/00*** | (2006.01) |
| ***G06K 19/00*** | (2006.01) |
| ***G06K 19/06*** | (2006.01) |

(52) U.S. Cl. ...................... 235/385; 235/487; 235/492; 707/10

(58) Field of Classification Search ................ 235/385, 235/492, 487; 707/10; 340/10.1, 5.92, 572.1, 340/825.34

See application file for complete search history.

(56) References Cited

U.S. PATENT DOCUMENTS 4,802,218 A * 1/1989 Wright et al. ................. 705/60
4,900,903 A * 2/1990 Wright et al. ............... 235/380
7,023,341 B2 * 4/2006 Stilp ....................... 340/572.1
7,151,445 B2 * 12/2006 Medve et al. .......... 340/539.15
7,227,446 B2 * 6/2007 Kumazaki et al. ......... 340/5.61
2005/0061879 A1 * 3/2005 Honda ........................ 235/385

FOREIGN PATENT DOCUMENTS

JP 2000-048066 2/2000

* cited by examiner

*Primary Examiner*—Daniel Walsh
(74) *Attorney, Agent, or Firm*—Carrier, Blackman & Associates, P.C.; William D. Blackman; Joseph P. Carrier

(57) ABSTRACT

An RFID tag access authentication system including a data processing terminal, a memory medium and a RFID tag. The data processing terminal generates a request signal for requesting a first key data, and transmits the request signal to the memory medium. The system transmits an inputted first identification data and the first key data received from the memory medium to the RFID tag. The system accesses the RFID tag in response to receiving of an access authentication data from the RFID tag. The RFID tag stores a second identification data and a second key data corresponding to the second identification data. The system compares a first set of the first identification data and the first key data with a second set of the second identification data and the second key data. Then, the system generates the access authentication data when the first set agrees with the second set.

10 Claims, 6 Drawing Sheets

RFID TAG ACCESS AUTHENTICATION SYSTEM AND RFID TAG ACCESS AUTHENTICATION METHOD

BACKGROUND OF THE INVENTION

1. Field of the Invention

The present invention relates to an RFID tag access authentication system and an RFID tag access authentication method. More particularly, the present invention relates to an authentication system for accessing of a recording medium such as a Radio Frequency Identification (hereinafter referred to as RFID) tag attached to a product.

2. Description of the Related Art

A modern distribution system is based on mass production and mass consumption. In this system, a product produced in a factory has a product lifecycle to be recycled. That is, firstly, the product is produced in a production part of the product lifecycle. Then, the product is shipped from the production part to a distribution part of the product lifecycle, such as a warehouse. Next, the product is placed on the market in a sales and service part of the product lifecycle. Then, the sold product is collected as a used product, and is discarded to be recycled in a discarding and recycling part of the product lifecycle. Each of the product lifecycles (mainly, the production part, the distribution part, the sales and service part, and the discarding and recycling part) comes to be varied corresponding to widening and enlarging of the distribution market of the product and varying products.

Especially, it is getting mainstream that the manufacturers have to be responsible for the products in last phase of the product lifecycle, as rising needs by the distribution market caring for environment issues, even in the distribution part related to collecting, discarding and recycling used product. Therefore, it is essentially important for the manufacturers supplying the products to the market to manage data of the products in each part of the product lifecycle.

As an example of a method for managing the product lifecycle, a technique for managing the product lifecycle by using an RFID tag attached to a product is disclosed in the Japanese Laid Open Patent Application (JP2000-48066). In this technique, an RFID tag, which memorizes data of a product, is attached to the product. Then, by reading out the data from the RFID tag, a state of the product is ascertained. In this technique, a lifecycle database to manage the product lifecycle is provided at each distribution hub. Data more detailed than that memorized in the RFID tag is stored in the database.

The data stored in the database are related to the data memorized in the RFID tag to be organized in order to manage the data. Each of the databases is provided to corresponding ones of a production control system of a manufacture, marketing management systems of distributors, marketing management systems of retailers, service management systems of companies dealing with maintenance and services, and management systems of the discarding/recycling companies. These plural databases are connected each other by network so as to refer to each data. In this conventional method for managing the product lifecycle, these companies collaborate with each other in the data regarding the products.

The product data in the database provided in each system hub are managed only by a product ID. An information terminal connected with the network can access the database at any place in the network by using the product ID. In this way, the data in the database provided in each system hub can be effectively utilized without any geographic or time constraints.

A person who knows the product ID to access the database can freely access the data of the product stored in the database. In order to utilize the data in the database more effectively in each system hub, it is necessary to improve security level such as an access restriction wherein only the person who registers his/her personal data can access the database. As a method to improving of the security level, it is well known that a right of writing data in the recording medium is permitted only after the authentication of a person by an ID and a password.

A person authentication by an ID and a password exerts its effect on data communication using data terminals connected with a network. In such case, only a password holder has responsibility for a password management. This password management, that is one password is managed by one person, excels in the light of prevention of data leakage. Therefore, it is desired that the management responsibility of a security manager will be reduced, keeping the same security protection effect as that of the method wherein one password is managed by one person.

SUMMARY OF THE INVENTION

Therefore, an object of the present invention is to provide an RFID tag access authentication system and an RFID tag access authentication method in which management responsibility of a security manager can be reduced, keeping the same security protection effect as that of the method wherein one password is managed by one person.

Another object of the present invention is to provide an RFID tag access authentication system and an RFID tag access authentication method in which the leak of confidential (secret) data can be avoided.

Still another object of the present invention is to provide an RFID tag access authentication system and an RFID tag access authentication method in which a security protection level can be kept the same level as that of the method wherein one password is managed by one person, without being aware of a password.

This and other objects, features and advantages of the present invention will be readily ascertained by referring to the following description and drawings.

In order to achieve an aspect of the present invention, the present invention provides an RFID tag access authentication system including a data processing terminal, a memory medium and an RFID tag. The data processing terminal includes an input unit, and a first data processing unit, a first communication unit, a second communication unit. By the input unit, a first identification data is inputted to the data processing terminal. The first data processing unit generates a request signal for requesting a first key data. The first communication unit transmits the request signal to the memory medium. The second communication unit transmits the first identification data and the first key data received from the memory medium to the RFID tag. The first data processing unit accesses the RFID tag in response to receiving of an access authentication data from the RFID tag. The memory medium includes a first memory unit and a third communication unit. The first memory unit stores the first key data. The third communication unit transmits the first key data in the first memory unit to the data processing terminal in response to the request signal. The RFID tag includes a second memory unit, a second data processing unit and a fourth communication unit. The second memory unit stores a second identification data and a second key data corresponding to the second identification data. The second data processing unit compares a first set of the first identification data and the first key data with a second set of the second identification data and the second key data in the second memory unit. Then, the second data processing unit generates the access authentication data when the first set agree with the second set. The fourth communication unit transmits the access authentication data to the data processing terminal.

In the RFID tag access authentication system, the second memory unit includes a plurality of the second sets of the second identification data and the second key data. Each of the plurality of second sets corresponds to each of a plurality of data items stored in the second memory unit.

In the RFID tag access authentication system, the memory medium may be an IC card, including at least one IC chip and an antenna.

In order to achieve another aspect of the present invention, the present invention provides an RFID tag access authentication system including a data processing terminal, a memory medium, and an RFID tag. The data processing terminal includes an input unit, a first data processing unit, and a first communication unit. By the input unit, a first identification data is inputted to the data processing terminal and a second communication unit. The first data processing unit generates a first request signal for requesting a first key data, and a second request signal for requesting a second identification data and a second key data corresponding to the second identification data. The first communication unit transmits the first request signal to the memory medium, and receives the first key data from the memory medium. The second communication unit transmits the second request signal to the RFID tag, and receives the second identification data and the second key data from the RFID tag. The first data processing unit compares a first set of the first identification data and the first key data with a second set of the second identification data and the second key data. Then, the first data processing unit accesses the RFID tag when the first set agree with the second set, and deletes the first key data, the second identification data and the second key data when the first set does not agree with the second set. The memory medium includes a first memory unit and a third communication unit. The first memory unit stores the first key data. The third communication unit transmits the first key data in the first memory unit to the data processing terminal in response to the first request signal. The RFID tag includes a second memory unit and a fourth communication unit. The second memory unit stores the second set of the second identification data and the second key data. The fourth communication unit transmits the second set of the second identification data and the second key data in the second memory unit to the data processing terminal.

In the RFID tag access authentication system, the second memory unit includes a plurality of the second sets of the second identification data and the second key data. Each of the plurality of second sets corresponds to each of plurality of data items stored in the second memory unit.

In the RFID tag access authentication system, the memory medium may be an IC card, including at least one IC chip and an antenna.

In order to achieve still another aspect of the present invention, the present invention provides a RFID tag access authentication method including the steps of: (a) generating a request signal for requesting a first key data by a data processing terminal, in response to an inputted first identification data; (b) transmitting the request signal to a memory medium by the data processing terminal; (c) transmitting the first key data to the data processing terminals in response to the request signal, by the memory medium; (d) transmitting the first identification data and the first key data received from the memory medium to an RFID tag by the data processing terminal; (e) comparing a first set of the first identification data and the first key data with a second set of a second identification data and a second key data stored in the RFID tag, and generating a access authentication data indicating an authentication for accessing the RFID tag when the first set agree with the second set, by the RFID tag; and (f) accessing the RFID tag in response to receiving the access authentication data from the RFID tag by the data processing terminal.

In order to achieve still another aspect of the present invention, the present invention provides an RFID tag access authentication method including: generating a first request signal for requesting a first key data by a data processing terminal, in response to an inputted first identification data; transmitting the first request signal to a memory medium by the data processing terminal; transmitting the first key data to the data processing terminal in response to the first request signal by the memory medium; generating a second request signal for requesting a second identification data and a second key data corresponding to the second identification data by the data processing terminal; transmitting the second request signal to an RFID tag by the data processing terminal; transmitting the second identification data and the second key data to the data processing terminal in response to the second request signal by RFID tag; comparing a first set of the first identification data and the first key data with a second set of the second identification data and the second key data by the data processing terminal; and accessing the RFID tag when the first set agree with the second set, and deleting the first key data, the second identification data and the second key data when the first set does not agree with the second set, by the data processing terminal.

In order to achieve yet still another aspect of the present invention, the present invention provides a computer program product embodied on a computer-readable medium and including code that, when executed, causes a computer to perform the following: generating a request signal for requesting a first key data by a data processing terminal, in response to an inputted first identification data; transmitting the request signal to a memory medium by the data processing terminal; transmitting the first identification data and the first key data received from the memory medium to an RFID tag by the data processing terminal; and accessing the RFID tag in response to receiving of an access authentication data from the RFID tag by the data processing terminal. The RFID tag compares a first set of the first identification data and the first key data with a second set of a second identification data and a second key data stored in the RFID tag, and generates the access authentication data indicating an authentication for accessing the RFID tag when the first set agree with the second set to transmit to the data processing terminal, by the RFID tag.

In order to achieve yet still another aspect of the present invention, the present invention provides a computer program product embodied on a computer-readable medium and including code that, when executed, causes a computer to perform the following: generating a first request signal for requesting a first key data by a data processing terminal, in response to an inputted first identification data; transmitting the first request signal to a memory medium by the data processing terminal; generating a second request signal for requesting a second identification data and a second key data corresponding to the second identification data by the data processing terminal; transmitting the second request signal to an RFID tag by the data processing terminal; comparing a first set of the first identification data and the first key data received from the memory medium with a second set of the second identification data and the second key data received from the RFID tag by the data processing terminal; and accessing the RFID tag when the first set agree with the second set, and deleting the first key data, the second identification data and the second key data when the first set does not agree with the second set, by the data processing terminal.

DESCRIPTION OF THE PRESENT EMBODIMENTS

An embodiment of an RFID tag access authentication system and an RFID tag access authentication method according to the present invention will be described below with reference to the attached drawings. Even though this embodiment is described about a product lifecycle data management system for motorcycles, the present invention will be applied to other products such as automobiles, robots, aircraft and power equipment.

A product produced in a factory has a product lifecycle. That is, firstly, the product is shipped from a production section (in the production part) and is placed on the market through a distribution section (in the distribution part) such as a warehouse. Then, the sold product is collected as a used product, and is discarded to be recycled. The present invention improves security of a system for managing of the product lifecycles, in case that a plurality of persons in charge can input product data in the system. The system manages the lifecycle of the products by storing product data in recording media attached to the products.

Figure 1:
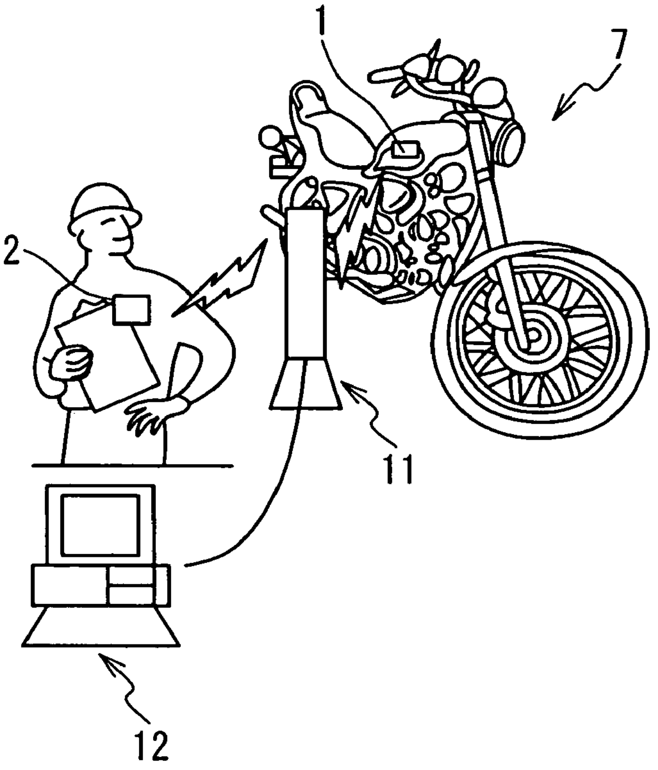
FIG. 1 is a schematic diagram showing a configuration of an RFID tag access authentication system of an embodiment of the present invention.

FIG. 1 is a schematic diagram showing a configuration of an RFID tag access authentication system of the embodiment of the present invention. In this case, the RFID tag access authentication system includes a data processing terminal 12. Referring to FIG. 1, the RFID tag access authentication system of this case includes an RFID tag (IC tag) 1 attached to a product 7, an IC card 2, a communication device 11 and a data processing terminal 12. This configuration is preferred in the case that the data processing terminal 12 having a data input function is not portable or mobile. Therefore, the configuration in FIG. 1 is especially suitable for the production part in the product lifecycle.

The RFID tag (IC tag) 1 is a memory medium which is possible to attach to the arbitrary part of a product 7. Data can be written and stored in a memory area of the RFID tag 1 with no contact. A setting of the memory area in the RFID tag 1 to store the data is possible to be changed arbitrarily. The memory area of the RFID tag 1 has a writable memory area and an un-writable, read only memory area. The data in the writable memory area can be rewritten. However, the data in the un-writable memory area can not be changed once the data is written. The RFID tag 1 is attached to each of the products 7 produced in the production part of the product lifecycle. The RFID tag 1 attached to the product 7 stores a product data (1*c*-2) regarding the product 7 in each memory region (see FIG. 3).

The IC card 2 is a recording medium by which data communication is possible with no contact. The IC card 2 is carried by a manager authorized to access the RFID tag 1. A password peculiar to the manager is stored in the IC card 2. As a method of carrying the IC card 2, it may be combined with a staff identification card. It may also be attached to a badge or an emblem and the like. The product 7 is capable of holding the attached RFID tag 1 and is constituted by a plurality of parts including at least one RFID tag 1. A product identification number (No.) is given to the product 7 during the producing process in the production part. In case that the product 7 is an motorcycle, a body number of a motorcycle produced in the production part is used as the product identification number (No.) in the embodiment.

The communication device (including antenna) 11 is a data transmission and reception apparatus which can communicate with RFID tag 1. The communication device 11 is set in production bases such as factories. The communication device 11 reads out the data written in the RFID tag 1 automatically or correspondingly to a read signal, and outputs the data to the data processing terminal 12. Also, the communication device 11 receives the data from the data processing terminal 12 and transmits the received data to the RFID tag 1 automatically or correspondingly to the writing signal.

The data processing terminal 12 can to communicate with the RFID tag 1 through the network. The data processing terminal 12 is set in the production bases such as factories. The data processing terminal 12 transmits the data to be written in the RFID tag 1 through the communication device 11. Also, The data processing terminal 12 receives a writing data (written in the RFID tag 1) outputted from the communication device 11. The data processing terminal 12 includes a data producing function to produce the writing data to be written in the RFID tag 1. The data processing terminal 12 is exemplified in a personal computer.

Figure 2:
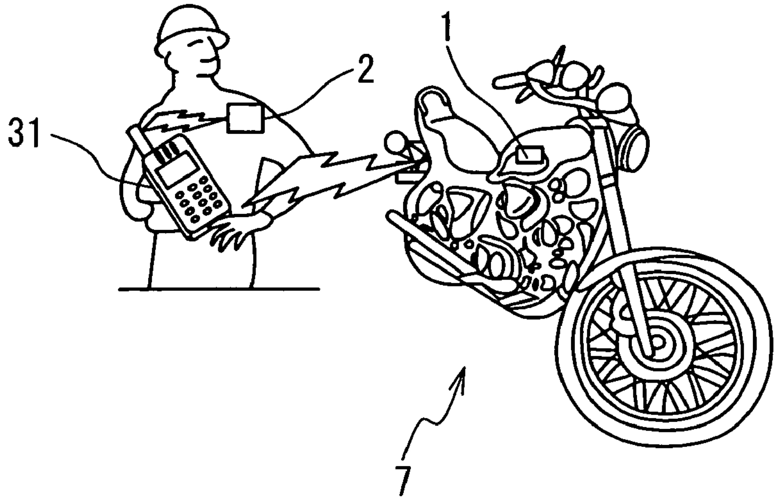
FIG. 2 is another schematic diagram showing a configuration of an RFID tag access authentication system of the embodiment of the present invention.

FIG. 2 is another schematic diagram showing a configuration of an RFID tag access authentication system of the embodiment of the present invention. In this case, the RFID tag access authentication system includes a mobile terminal 31. Referring to FIG. 2, the RFID tag access authentication system of this case includes an RFID tag 1 attached to a product 7, an IC card 2, and a mobile terminal 31. This configuration is preferred in the case that the mobile terminal 31 having a data input function is portable or mobile. Therefore, the configuration in FIG. 2 is especially suitable for the sales and services parts in the product lifecycle. It should be noted that the configurations of the RFID tag 1, the IC card 2 and the product 7 are same as those shown in FIG. 1.

The mobile terminal 31 is with portable and includes a communication unit by which data communication with the RFID tag 1 is possible through the network. The mobile terminal 31 further a functions to read the data stored in the RFID tag 1 attached to the product 7 and to write a new data to the RFID tag 1. Moreover, the mobile terminal 31 has a data producing function to produce the writing data to be written in the RFID tag 1. The mobile terminal 31 is exemplified in a cell phone, PDA(personal digital assistant) and PHS(personal handyphone system).

Figure 3:
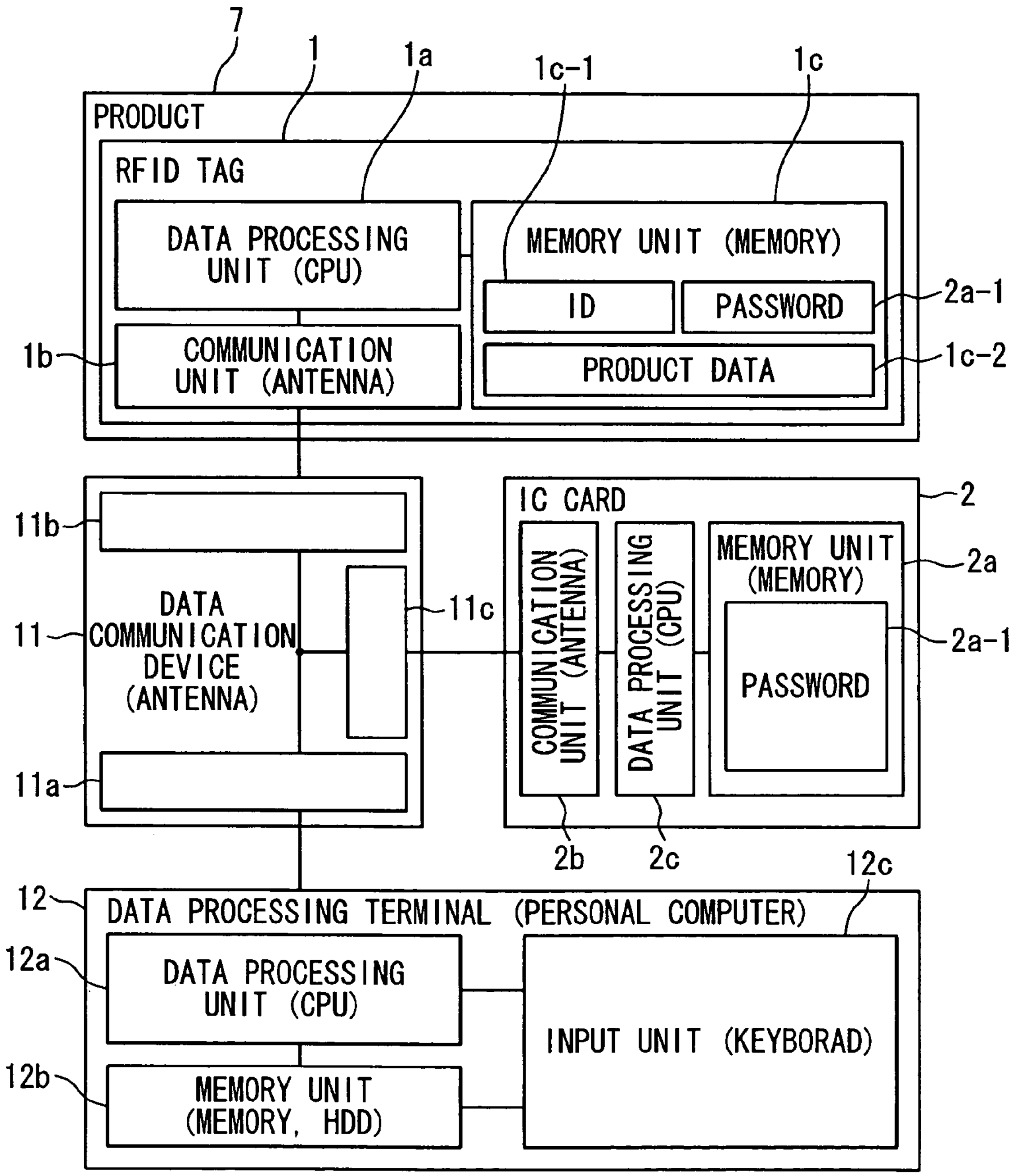
FIG. 3 is a block diagram showing the configuration of an RFID tag access authentication system of the embodiment of the present invention.

FIG. 3 is a block diagram showing the configuration of an RFID tag access authentication system of the embodiment of the present invention. In this case, this system uses the data processing terminal 12. The configuration of the system shown in FIG. 1 will be described below with reference to FIG. 3.

Referring to FIG. 3, the RFID tag access authentication system includes the RFID tag 1 attached to the product 7, the IC card 2, the communication device 11 and the data processing terminal 12, as mentioned above. The RFID tag 1 is attached to the product 7 so as not to be removed from the product 7 during the product lifecycle from the production to discarding for recycling.

The RFID tag 1 includes a data processing unit 1*a*, a communication unit 1*b*, and a memory unit 1*c*.

The data processing unit 1*a* is installed in the RFID tag 1 as a data processing function block. The data processing unit 1*a* is exemplified in a CPU (central processing unit) or another kind of a data processor. When data transmitted through the communication device 11 are written to the memory unit 1*c*, the data processing unit 1*a* executes a data processing to store the data in the RFID tag 1.

The communication unit 1*b* is installed in the RFID tag 1 as a communication antenna function block. The communication unit 1*b* receives a radio wave outputted from the communication device 11. The RFID tag 1 establishes a communication path to communicate with the communication device 11 in response to the radio wave received by the communication unit 1*b*.

The memory unit 1*c* is installed in the RFID tag 1 as a data memory function block. The memory unit 1*c* is writable through the communication unit 1*b* with no contact. The memory unit 1*c* stores the written data in the memory area, and permits some of the data to be changed arbitrarily. The memory area of the memory unit 1*c* has a writable memory area and an un-writable, read only memory area. The data in the writable memory area can be rewritten. However, the data in the un-writable memory area can not be changed once the data is written. The RFID tag 1 attached to the product 7 memorizes a product data (1*c*-2) of the product 7 in each product lifecycle. Also, the communication unit 1*b* can output a data with no contact. The communication unit 1*b* outputs the data stored in the memory unit 1*c* in response to the data output signal received through the communication unit 1*b*. The memory unit 1*c* stores an ID (1*c*-1) of a manager and a password (2*a*-1) of the manager so as to be one to one correspondence. The manager is authorized to update the data of the RFID tag 1 in each product lifecycle and the password (2*a*-1) is peculiar to the manager. Each of the ID (1*c*-1) and the password (2*a*-1) is encrypted. Persons who are not authorized to read the ID (1*c*-1) and the password (2*a*-1), can not read the stored ID (1*c*-1) and the stored password (2*a*-1). Also, contents of the data stored in the RFID tag 1 are different in every area of the product lifecycle. Therefore, it is preferable to set the ID and the password in every data of data tables of the RFID tag 1. As a result, it is possible to restrict data areas where the manager can access.

The IC card 2 further includes a memory unit 2*a*, a communication unit 2*b* and a data processing unit 2*c*. The data processing unit 2*c* is installed in the IC card 2 as a data processing function block. The data processing unit 2*c* is exemplified in a CPU (central processing unit) or another kind of a data processor. When data received through the communication device 11 are written to the memory unit 2*a*, the data processing unit 2*c* executes a data processing to store the data in the memory unit 2*a*. Also, the data processing unit 2*c* executes a data processing properly in response to a signal received through the communication device 11.

The memory unit 2*a* is installed in the IC card 2 as a data memory function block. The memory unit 2*a* is writable through the communication unit 2*b* with no contact. The memory unit 2*a* stores the written data in the memory area. The memory unit 2*a* stores a password (2*a*-1) of the manager who is authorized to update the data of the RFID tag 1. The password (2*a*-l) is encrypted to be stored. Persons who are not authorized to read the password (2*a*-l), can not read the stored password (2*a*-1).

Also, the IC card 2 can output a data with no contact. The IC card 2 outputs the data stored in the memory unit 2*a* in response to the data output signal received through the communication unit 2*b*. The communication unit 2*b* is installed in the IC card 2 as a communication antenna function block. The communication unit 2*b* receives a radio wave from the communication device 11. The IC card 2 establishes a communication path to communicate with the communication device 11 in response to the radio wave received by the communication unit 2*b*.

The communication device (including antenna) 11 is a communication apparatus including a data communication unit 11*a* and a radio communication unit 11*b*, 11*c*. The data communication unit 11*a* is to communicate (transmit and receive) data with the data processing terminal 12. The radio communication unit 11*b* is to communicate data with the RFID tag 1. The radio communication unit 11*c* is to communicate data with the IC card 2. Parts of the product 7, which are dealt at each production base in the production part, are various in sizes. Attaching the RFID tag 1 to each of parts which constitute the product 7, a gate with a large sized radio communication unit can not be established because of some large sized parts. Here, the gate is to let products through when the product is transferred to the next stage (step) of one of production, distribution, sales and discard. Even in such the case, the product lifecycle data management can be properly executed by establishing the communication device 11 in each base.

The data processing terminal 12 further includes a data processing unit 12*a*, a memory unit 12*b* and an input unit 12*c*. The data processing unit 12*a* is as a data processing function block. The data processing unit 12*a* is exemplified in a CPU (central processing unit) or another kind of a data processor. When a new data is rewritten to the RFID tag 1, the data processing unit 12*a* executes a data processing to rewrite the data stored in the RFID tag 1 corresponding to the data inputted from the input unit. The memory unit 12*b* is as a data memory functional block. The memory unit 12*b* is exemplified in a RAM (read only memory), RAM (random access memory) and magnetic recording medium. The input unit 12*c* is as a data input function block. The input unit 12*c* is exemplified in a keyboard for inputting letters (characters) and a sound collector (a microphone) for inputting voices. Also, the input unit 12*c* is connected with the data processing unit 12*a*. The inputted data is outputted from the input unit 12*c* to the data processing unit 12*a*.

Figure 4:
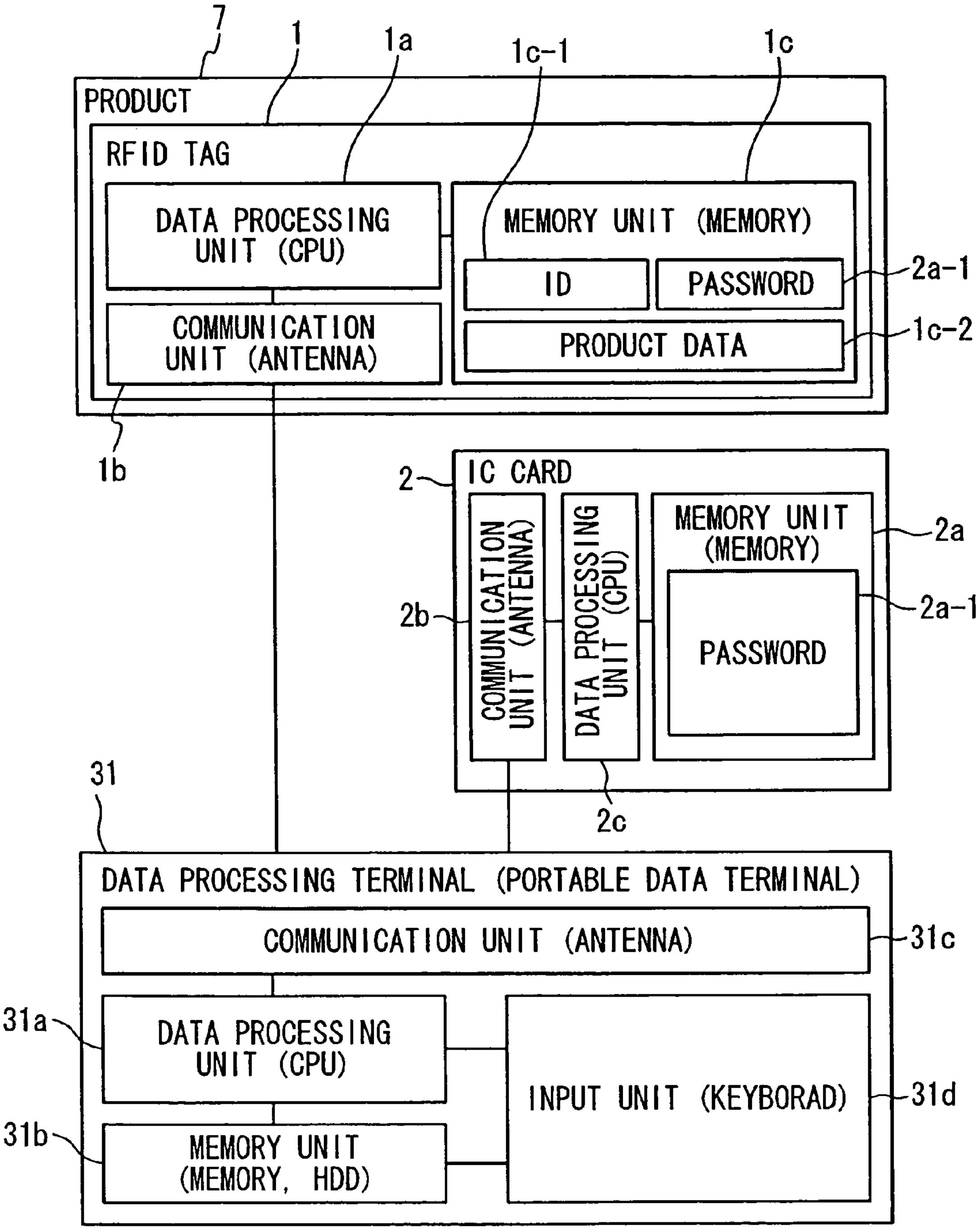
FIG. 4 is another block diagram showing the configuration of an RFID tag access authentication system of the embodiment of the present invention.

FIG. 4 is another block diagram showing the configuration of an RFID tag access authentication system of the embodiment of the present invention. The configuration of the system shown in FIG. 2 will be described below with reference to FIG. 4.

Referring to FIG. 4, the RFID tag access authentication system includes the RFID tag 1 attached to the product 7, the IC card 2, and the mobile terminal 31. The RFID tag 1 is attached to the product 7 so as not to be removed from the product 7 during the product lifecycle from the production to discarding for recycling.

The RFID tag 1, the IC card 2 and the product 7 are the same as those of FIG. 3.

The mobile terminal 31 includes a data processing unit 31*a*, a memory unit 31*b*, a communication unit 31*c* and an input unit 31*d*. The data processing unit 31*a* is as a data processing function block. The data processing unit 31*a* is exemplified in a CPU (central processing unit) or another kind of a data processor. When a new data is rewritten to the RFID tag 1, the data processing unit 31*a* executes a data processing to rewrite the data stored in the RFID tag 1 corresponding to the data inputted from the input unit. The memory unit 31*b* is as a data memory functional block. The memory unit 31*b* is exemplified in RAM, ROM and a magnetic recording medium. The communication unit 31*c* is as a communication function block having a function for data communication with the RFID tag 1 and the IC card 2. At least one of the communication unit 31*c* is installed in the mobile terminal 31. The communication unit 31*c* includes a data communication function with the RFID tag 1 and the IC card 2 with no contact. The input unit 31*d* is as a data input function block. The input unit 31*d* is exemplified in a keyboard for inputting letters (characters) and a sound collector (a microphone) for inputting voices. Also, the input unit 31*d* is connected with the data processing unit 31*a*. The inputted data inputted from the input unit 31*d* is outputted to the data processing unit 31*a*. Then, the data is executed by the data processing unit 31*a*.

Figure 5:
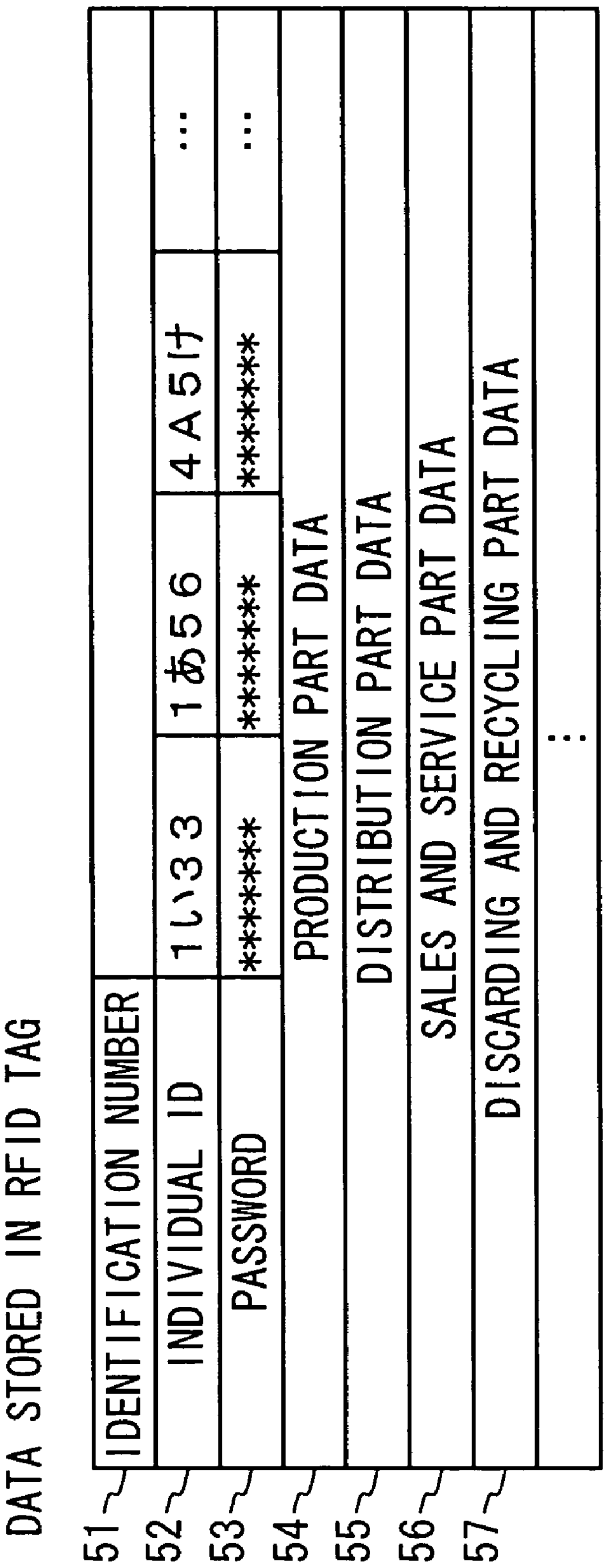
FIG. 5 is a diagram showing an RFID tag storage data table.

FIG. 5 is a diagram showing an RFID tag storage data table. The RFID tag storage data table indicates data to be stored in the memory unit 1*c* of the RFID tag 1. Referring to FIG. 5, an RFID tag storage data table includes an identification number 51, an individual ID 52, a password 53, a production part data 54, a distribution part data 55, a sales and service part data 56, and a discarding and recycling part data 57. The identification number 51 is a product identifier of the product 7. The identification number 51 is given to the product 7 produced at the production part in a specific process. Since the product lifecycle data management system of the motorcycle is described in this embodiment, the RFID tag 1 stores a body number of a produced motorcycle as the identification number 51.

The individual ID 52 is an ID storage table storing manager IDs. The system gives the manager ID to every manager who manages a product at each part of the product lifecycle. The password 53 is a password storage table storing passwords. The system gives the password to every manager who manages a product at each part of the product lifecycle same as the manager ID. The manager ID and the password for the manager who is given to the manager ID are corresponded for one to one. As the manager ID and the password exist in every one of a plurality of the manager, the RFID tag 1 relates each of the plurality of the manger IDs to a corresponding one of the plurality of the passwords so as to be in one to one correspondence. Then, the RFID tag 1 encrypts these manger IDs and the passwords so as to prevent a data leakage and stores them. The identification number 51, the individual ID 52 and the password 53 are written in a un-writable memory area (non rewritable region) of the memory unit 1*c* of the RFID tag 1. Also, the RFID tag 1 stores the data which is written at each part of the product lifecycle until the product 7 having the RFID tag 1 is discarded.

The production part data 54 is a data table which stores data of the product 7 of producing time in the production part. The production part data 54 further includes the following data in the table. That is, a writing time of day, a writing terminal ID, a product name/type, a date of manufacture, a manufacturing factory data, a modification data and a shipping data. Here, the writing time of day shows a date and a time when the production part data is written to the RFID tag 1. The writing terminal ID shows an identifier of the data terminal which writes the production part data. The product name/type shows a name and type of the product 7 to which the RFID tag 1 is attached. The date of manufacture shows a time and a day that the product 7 having the RFID tag 1 is produced. The manufacturing factory data shows a place the product 7 having the RFID tag 1 is produced. The modification data shows a modification of the product in the factory. The shipping data shows a time of day that production of the product 7 with the RFID tag 1 is completed and shipped (delivered) from the production part.

The distribution part data 55 is a data table which shows a distribution part data of the product 7 in a distribution channel in the distribution part. The distribution part data 55 further stores the following data in each of the plurality of distribution bases. That is, a writing time of day, a writing terminal ID, a transportation company name data, a shipping route data, a time of date of shipping, a date of loading. The writing time of day shows a time and a day that the distribution part data is written to the RFID tag 1. The writing terminal ID shows a identifier of the data terminal which writes the distribution part data. The transportation company name data shows a name of company in charge of the transportation of the product 7 having the RFID tag 1. The shipping route data shows the channel from shipping to loading of the product 7 with the RFID tag 1. The time of date of shipping shows a time and a date that the product 7 having the RFID tag 1 is shipped. The date of loading shows an arrival date of the product 7 having the RFID tag 1 through the distribution channel.

The sales and service part data 56 is a data table which shows the sales and service part data of the product 7 in a sales channel in the sales and service part. The sales and service part data 56 further stores the following data in each of the plurality of sales and service bases. That is, a writing time of day, a writing terminal ID, a sales shop data, a sales date, a maintenance date, and a maintenance data. The writing time of day shows a time and a day that the sales and service part data is written to the RFID tag 1. The writing terminal ID shows an identifier of the terminal which writes the sales and service part data. The sales shop data shows a place of the shop selling the product 7 having the RFID tag 1. The sales date shows a date that the shop sells the product 7 having the RFID tag 1. The maintenance date shows a date the product 7 having the RFID tag 1 is maintained, checked and repaired. The maintenance data shows contents of maintenance, checking and repairing of the product 7 with the RFID tag 1.

The discarding and recycling part data 57 is a data table which shows the discarding and recycling part data of the product 7 sent to the discarding and recycling part. The sales and service part data 56 further stores the following data in the discarding and recycling bases. That is, a writing time of day, a writing terminal ID, a collection trader name data, a collection time of date, a scrapper name data, a discarding time of date. The writing time of day shows a time and a day that discarding and recycling part data is written to the RFID tag 1. The writing terminal ID shows an identifier of the data terminal which writes discarding and recycling part data. The collection trader name data shows a name of collection trader in charge of collecting the product 7 having the RFID tag 1. The collection time of date shows a date and a time that the product 7 having the RFID tag 1 is collected. The scrapper name data shows a name of a scrapper in charge of discarding the product 7 having the RFID tag 1 when the product 7 is judged to be discarded. The discarding time of date showing a date and a time that the product 7 having the RFID tag 1 is discarded.

Next, a preferred embodiment of an operation of an RFID tag access authentication system and an RFID tag access authentication method according to the present invention will be described below with reference to the attached drawings.

Figure 6:
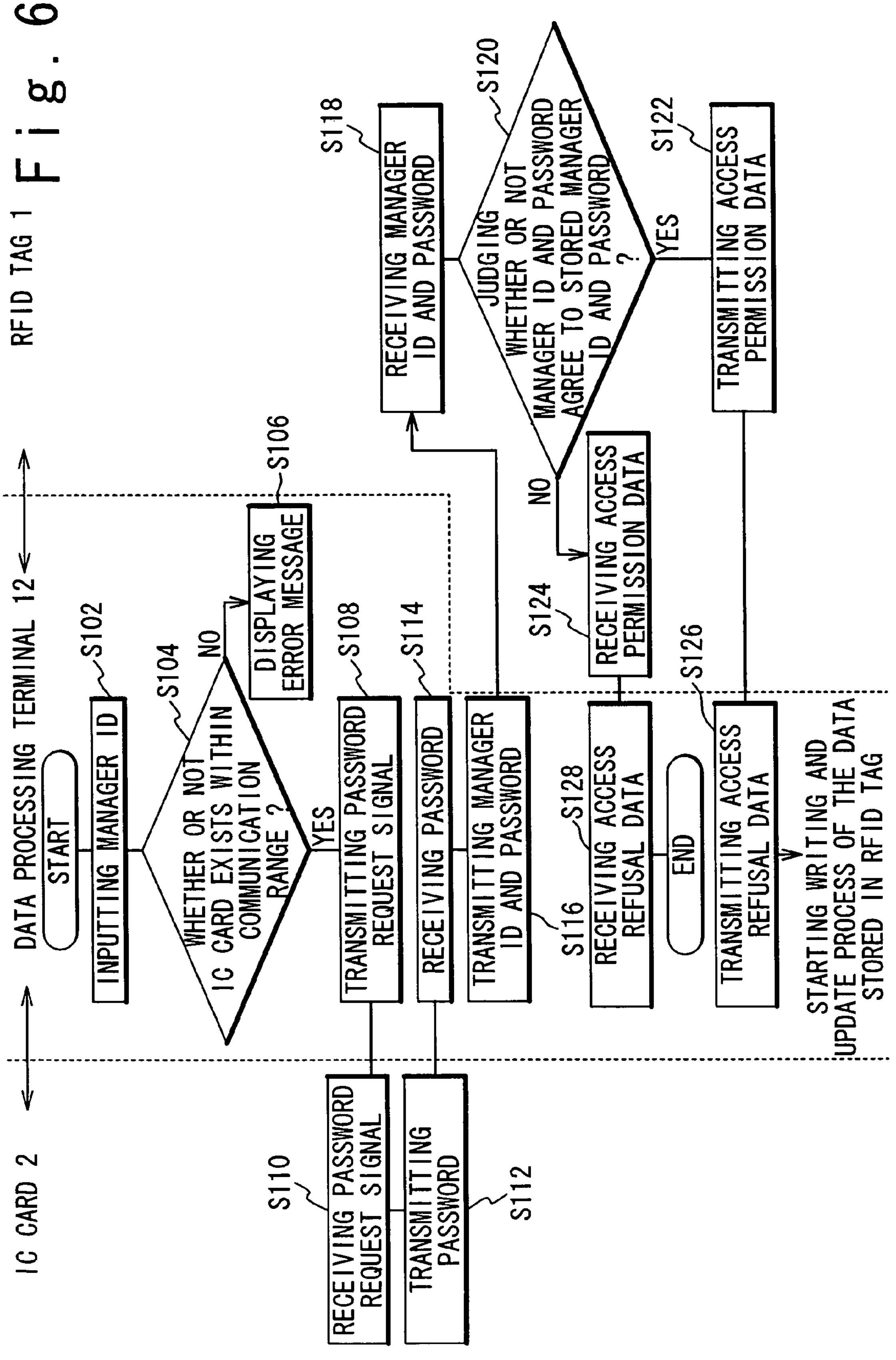
FIG. 6 is a flow chart showing an operation of an RFID tag access authentication system (an RFID tag access authentication method) of the embodiment of the present invention.

FIG. 6 is a flow chart showing an operation of an RFID tag access authentication system (an RFID tag access authentication method) of the embodiment of the present invention. The operation shown in the flow chart of FIG. 6 indicates the case that the RFID tag 1 attached to the product 7 includes a CPU (central processing unit) and the RFID tag 1 itself makes a judgment in a processing. Referring to FIG. 6, the operation starts when the manager ID is inputted to a data input unit of a data processing terminal 12. As the operation of one area is generally the same as those of other areas, the following explanation of the operation is described in case of the configuration shown in FIG. 3 as an example.

In the step S102, when trying to access the RFID tag 1 attached to the product 7, the access applicant inputs the manager ID assigned to himself from the input unit 12*c* of the data processing terminal 12 provided in the system. The input unit 12*c* outputs the inputted manger ID to the data processing unit 12*a*. The data processing unit 12*a* stores the inputted manager ID in the memory unit 12*b*.

In a step S104, the data processing unit 12*a*, which receives the manager ID from the input unit 12*c*, starts the search of the IC card 2 in response to the input of the manager ID. The data processing unit 12*a* carries out the search by judging whether or not the IC card 2 exists within the communication range (area) to communicate through the communication device 11. That is, the data processing unit 12*a* judges whether the data processing unit 12*a* can communicate with the IC card 2 through the data communication unit 11*a* and the radio communication unit 11*b*. When the data processing unit 12*a* can detect the IC card 2 as a result of the search, the process advances towards a step S108. When the data processing unit 12*a* can not detect the IC card 2 as a result of the search, the process advances towards a step S106.

In the step S106, the data processing unit 12*a* generates a data indicating that a reply from the IC card 2 could not be received. Then, the data processing unit 12*a* makes the display unit (not shown) of the data processing terminal 12 display an error message data corresponding to that data. The data processing terminal 12 displaying the error message data is turned back to an initial state waiting for the manager ID to be inputted.

In the step S108, the data processing unit 12*a* of the data processing terminal 12 which detected the IC card 2 as a result of the search generates a password request signal. The password request signal shows a request to the IC card 2 for the transmission of the password. The data processing unit 12*a* transmits the generated password request signal to the IC card 2 through the communication device 11.

In a step S110, the password request signal transmitted from the data processing terminal 12 is received at the communication unit 2*b* of the IC card 2. The communication unit 2*b* outputs the received password request signal to the data processing unit 2*c*. The data processing unit 2*c* extracts the password stored in the memory unit 2*a* in response to the received password request signal.

In a step S112, the data processing unit 2*c* outputs the extracted password through the communication unit 2*b*. In a step S114, the data processing unit 12*a* receives the password outputted from the IC card 2 through the communication device 11. In a step S116, the data processing unit 12*a* extracts the manager ID stored in the memory unit 12*b* in the step S102 in response to receiving of the password. Then, the data processing unit 12*a* transmits the extracted manager ID and the received password correspondingly to the RFID tag 1 through the communication device 11.

In a step S118, the communication unit 1*b* of the RFID tag 1 receives the manager ID and the password transmitted from the data processing terminal 12 through the communication device 11. Then, the communication unit 1*b* outputs each of the received manager ID and password to the data processing unit la.

In a step S120, the data processing unit 1*a* searches the password which corresponds to the manager ID from the memory unit 1*c* in response to the manager ID outputted from the communication unit 1*b*. When the received password which corresponds to the manager ID can not be detected as a result of the search, the process advances towards a step S124. When the received password which corresponds to the manager ID can be detected, the data processing unit 1*a* judges an agreement of the detected password and the password transmitted from the data processing terminal 12. When the detected password agrees to the transmitted password as a result of the judgment, the process advances towards a step S122. When each password does not agree, the process advances towards a step S124.

In the step S122, the data processing unit 1*a* generates an access permission data which indicates a permission of an access to the RFID tag 1 in response to the agreement of the password. Then, the data processing unit 1*a* outputs the access permission data to the memory unit 1*c*. Also, the data processing unit 1*a* outputs the access permission data to the data processing terminal 12.

In a step S126, the data processing unit 12*a* receives the access permission data outputted from the RFID tag 1 through the communication device 11. The data processing terminal 12 starts a writing and update process of the data to store in the RFID tag 1 in response to the receiving of the access permission data.

In the step S124, the data processing unit 1*a* generates an access refusal data which indicates a refusal of access to the RFID tag 1 in response to the following things. One thing is that the password corresponding to the manager ID received from the data processing terminal 12 is not stored in the memory unit 1*c*. The other thing is that the password corresponding to the stored manager ID does not agree to the password transmitted from the data processing terminal 12. The data processing unit 1*a* outputs the generated access refusal data to the memory unit 1*c*. Also, the data processing unit 1*a* outputs the access refusal data to the data processing terminal 12.

In a step S128, the data processing unit 12*a* receives the access refusal data transmitted from the RFID tag 1. The data processing terminal 12 ends an access processing in response to receiving the access refusal data. The flow of the process returns to the initial state. The data processing terminal 12 becomes a standby state waiting for an manager ID input from the data input unit 12*c*.

In this system, the manager of the system is given a rewriting authority of the data stored in the data storage media such as the RFID tag, and can access a data storage medium in the system by using a password. As mentioned above, it is possible to reduce a burden of the password management for the manager possessing the password with no declining of security level.

Figure 7:
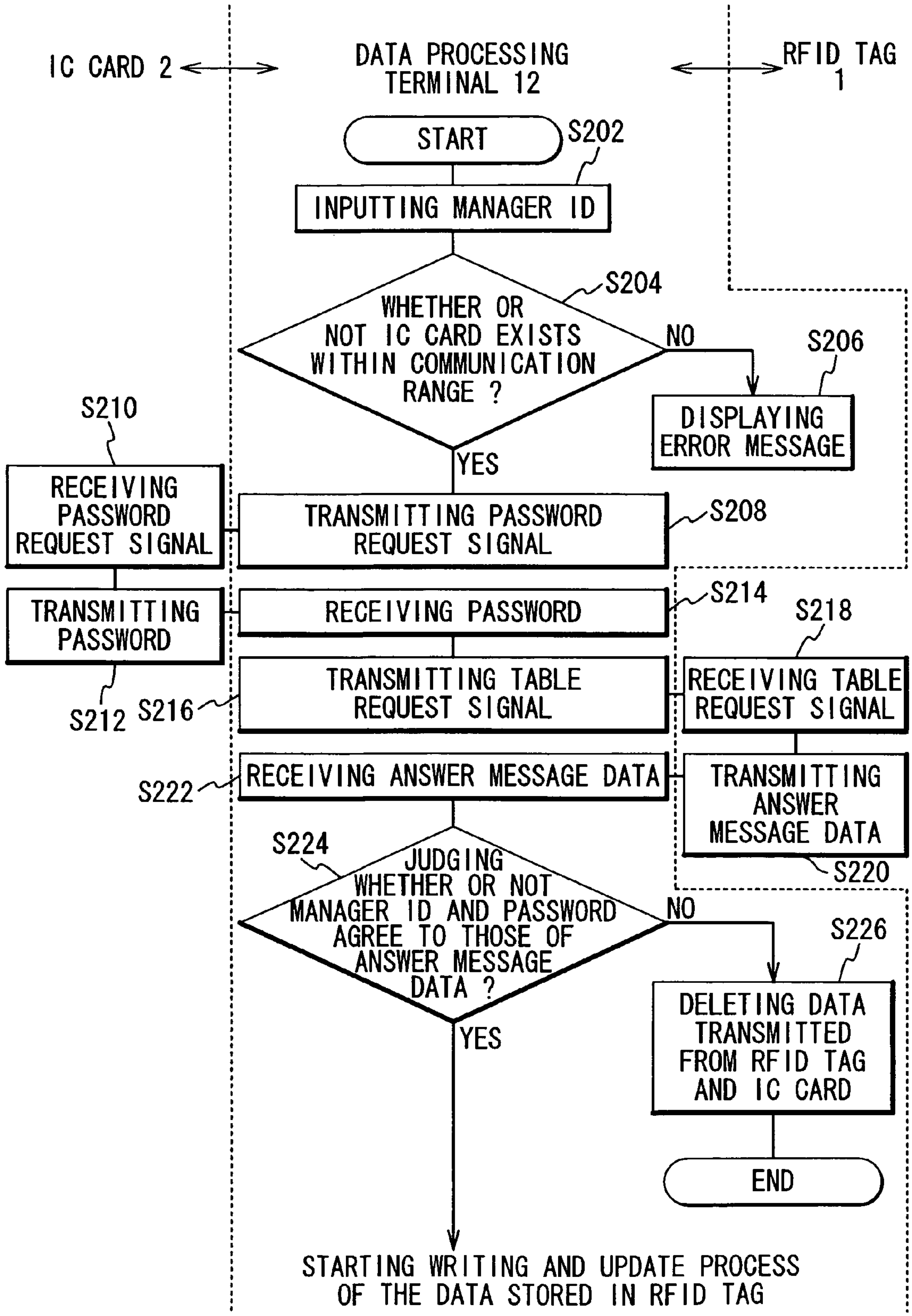
FIG. 7 is a flow chart showing another operation of an RFID tag access authentication system (an RFID tag access authentication method) of the embodiment of the present invention.

FIG. 7 is a flow chart showing another operation of an RFID tag access authentication system (an RFID tag access authentication method) of the embodiment of the present invention. The operation shown in the flow chart of FIG. 7 indicates the case that the RFID tag 1 attached to the product 7 does not include a CPU (central processing unit) and therefore the RFID tag 1 itself does not makes a judgment in a processing. Referring to FIG. 7, the operation starts when the manager ID is inputted to a data input unit of a data processing terminal 12. As the operation of one area is generally the same as those of other areas, the following explanation of the operation is described in case of the configuration shown in FIG. 3 as an example.

In a step S202, when trying to access the RFID tag 1 attached to the product 7, the access applicant inputs the manager ID assigned to himself from the input unit 12*c* of the data processing terminal 12 provided in the system. The input unit 12*c* outputs the inputted manger ID to the data processing unit 12*a*. The data processing unit 12*a* stores the inputted manager ID in the memory unit 12*b*.

In a step S204, the data processing unit 12*a*, which receives the manager ID from the input unit 12*c*, starts the search of the IC card 2 in response to the input of the manager ID. The data processing unit 12*a* carries out the search by judging whether or not the IC card 2 exists within the communication range to communicate through the communication device 11. That is, the data processing unit 12*a* judges whether the data processing unit 12*a* can communicate with the IC card 2 through the data communication unit 11*a* and the radio communication unit 11*b*. When the data processing unit 12*a* can detect the IC card 2 as a result of the search, the process advances towards the step S208. When the data processing unit 12*a* can not detect the IC card 2 as a result of the search, the process advances towards the step S206.

In the step S206, the data processing unit 12*a* generates a data indicating that a reply from the IC card 2 could not be received. Then, the data processing unit 12*a* makes the display unit (not shown) of the data processing terminal 12 displays an error message data corresponding to that data. The data processing terminal 12 displaying the error message data is turned back to an initial state waiting for the manager ID to be inputted.

In the step S208, the data processing unit 12*a* of the data processing terminal 12 which detected the IC card 2 as a result of the search generates a password request signal. The password request signal shows a request to the IC card 2 for the transmission of the password. The data processing unit 12*a* transmits the generated password request signal to the IC card 2 through the communication device 11.

In a step S210, the password request signal transmitted from the data processing terminal 12 is received at the communication unit 2*b* of the IC card 2. The communication unit 2*b* outputs the received password request signal to the data processing unit 2*c*. The data processing unit 2*c* extracts the password stored in the memory unit 2*a* in response to the received password request signal.

In a step S212, the data processing unit 2*c* outputs the extracted password through the communication unit 2*b*.

In a step S214, the data processing unit 12*a* receives the password outputted from the IC card 2 through the communication device 11. The data processing unit 12*a* stores the received password in the memory unit 12*b* as a reception password with inputted manager ID. Also, the data processing unit 12*a* produces a table request signal to require a transmission of the ID and the password to be stored in the RFID tag 1 in response to receiving the password. In a step S216, the data processing unit 12*a* transmits the produced table request signal to the RFID tag 1 through the communication device 11.

In a step S218, the table request signal transmitted from the data processing terminal 12 is received by the communication unit 1*b* of the RFID tag 1. The communication unit 1*b* outputs the received table request signal to the data processing unit 1*a*. The data processing unit 1*a* generates an answer message data which contains the table to be stored in the memory unit 1*c* to have the ID and the password corresponded to the ID in response to the outputted table request signal. In a step S220, the data processing unit 1*a* outputs the generated answer message data from the communication unit 1*b*.

In a step S222, the data processing unit 12*a* receives the answer message data transmitted from the RFID tag 1 through the communication device 11. The data processing unit 12*a* extracts the inputted ID stored in the memory unit 12*b* at the step S202 in response to the reception of the answer message data. At the same time, the data processing unit 12*a* extracts the reception password stored in the memory unit 12*b* at the step S214, then advances towards a step S224.

In the step S224, the data processing unit 12*a* judges whether or not the inputted ID and the reception password correspond correctly. That is, firstly, the data processing unit 12*a* generates a comparative data to have the input ID and the reception password corresponded. Then, the comparative data, and the ID and the password corresponding to the ID which are included in the answer message data received at the step S222, are compared.

When both of them agree as a result of the comparison, the data processing terminal 12 starts the writing and update process of the data to be store in the RFID tag 1. When these items do not agree as a result of the comparison, the system advances towards a step S226.

In the step S226, the data processing unit 12*a* deletes the data transmitted from the RFID tag 1 and the IC card 2 in the memory unit 12*b*, then, returns to the initial state. The data processing terminal 12 becomes a standby state waiting for an ID input from the data input unit 12*c*.

In this way, the system becomes able to be configured by using an RFID tag which does not include a CPU. As a result, even if an RFID tag access is extend over a long period of time such as the product lifecycle, this RFID tag 1 with no CPU can prevent this system from disturbing the management of the product lifecycle caused by the damage of the CPU in the RFID tag.

Although the present embodiment of the invention has been described in detail, it will be understood by persons skilled in the art that variations and modifications may be made thereto without departing from the spirit or essence of the invention. All such variations and modifications are intended to be encompassed by the scope of the claims appended hereto.

What is claimed is:

1. A radio frequency identification (RFID) tag access authentication system comprising:

a data processing terminal, a memory medium, and an RFID tag, wherein said data processing terminal comprises:

an input unit by which a first identification data is inputted to said data processing terminal, a first data processing unit which generates a request signal for requesting a first key data, a first communication unit which transmits said request signal to said memory medium, a second communication unit which transmits said first identification data and said first key data received from said memory medium to said RFID tag, and wherein said first data processing unit accesses said RFID tag in response to receiving an access authentication data from said RFID tag, wherein said memory medium comprises:

a first memory unit which stores said first key data, and a third communication unit which transmits said first key data in said first memory unit to said data processing terminal in response to said request signal, and wherein said RFID tag comprises:

a second memory unit which stores a second identification data and a second key data corresponding to said second identification data, a second data processing unit which compares a first data set comprising said first identification data and said first key data with a second data set comprising said second identification data and said second key data in said second memory unit, and generates said access authentication data when said first data set agrees with said second data set, and a fourth communication unit which transmits said access authentication data to said data processing terminal.

2. The RFID tag access authentication system according to claim 1, wherein said second memory unit includes a plurality of said second data sets comprising said second identification data and said second key data, each of said plurality of second data sets corresponds to each of a plurality of data items stored in said second memory unit.

3. The RFID tag access authentication system according to claim 1, wherein said memory medium comprises an IC card, including at least one IC chip and an antenna.

4. A radio frequency identification (RFID) tag access authentication system comprising:

a data processing terminal, a memory medium, and an RFID tag, wherein said data processing terminal comprises:

an input unit by which a first identification data is inputted to said data processing terminal, a first data processing unit which generates a first request signal for requesting a first key data, and a second request signal for requesting a second identification data and a second key data corresponding to said second identification data, a first communication unit which transmits said first request signal to said memory medium, and receives said first key data from said memory medium, a second communication unit which transmits said second request signal to said RFID tag, and receives said second identification data and said second key data from said RFID tag, and wherein said first data processing unit compares a first data set comprising said first identification data and said first key data with a second data set comprising said second identification data and said second key data, accesses said RFID tag when said first data set agrees with said second data set, and deletes said first key data, said second identification data and said second key data when said first data set does not agree with said second data set, wherein said memory medium comprises:

a first memory unit which stores said first key data, and a third communication unit which transmits said first key data in said first memory unit to said data processing terminal in response to said first request signal, and wherein said RFID tag comprises:

a second memory unit which stores said second data set comprising said second identification data and said second key data, and a fourth communication unit which transmits said second data set comprising said second identification data and said second key data in said second memory unit to said data processing terminal.

5. The RFID tag access authentication system according to claim 4, wherein said second memory unit includes a plurality of said second data sets comprising said second identification data and said second key data, each of said plurality of second data sets corresponds to each of a plurality of data items stored in said second memory unit.

6. The RFID tag access authentication system according to claim 4, wherein said memory medium comprises an IC card, including at least one IC chip and an antenna.

7. A radio frequency identification (RFID) tag access authentication method, comprising the steps of:

(a) generating a request signal for requesting a first key data by a data processing terminal, in response to a first identification data;

(b) transmitting said request signal to a memory medium by said data processing terminal;

(c) transmitting said first key data to said data processing terminal in response to said request signal by said memory medium;

(d) transmitting said first identification data and said first key data received from said memory medium to an RFID tag by said data processing terminal;

(e) comparing a first data set comprising said first identification data and said first key data with a second data set comprising a second identification data and a second key data stored in said RFID tag, and generating a access authentication data indicating an authentication for accessing said RFID tag when said first data set agrees with said second data set, by said RFID tag; and (f) accessing said RFID tag in response to receiving of said access authentication data from said RFID tag by said data processing terminal.

8. A radio frequency identification (RFID) tag access authentication method, comprising the steps of:

generating a first request signal for requesting a first key data by a data processing terminal, in response to a first identification data;

transmitting said first request signal to a memory medium by said data processing terminal;

transmitting said first key data to said data processing terminal in response to said first request signal by said memory medium;

generating a second request signal for requesting a second identification data and a second key data corresponding to said second identification data by said data processing terminal;

transmitting said second request signal to an RFID tag by said data processing terminal;

transmitting said second identification data and said second key data to said data processing terminal in response to said second request signal by said RFID tag;

comparing a first data set comprising said first identification data and said first key data with a second data set comprising said second identification data and said second key data by said data processing terminal; and accessing said RFID tag when said first data set agrees with said second data set, and deleting said first key data, said second identification data and said second key data when said first data set does not agree with said second data set, by said data processing terminal.

9. A computer program product embodied on a computer-readable medium and comprising code that, when executed, causes a computer to perform the following:

generating a request signal for requesting a first key data by a data processing terminal, in response to a first identification data;

transmitting said request signal to a memory medium by said data processing terminal;

transmitting said first identification data and said first key data received from said memory medium to a radio frequency identification (RFID) tag by said data processing terminal; and accessing said RFID tag in response to receiving of an access authentication data from said RFID tag by said data processing terminal, wherein said RFID tag compares a first data set comprising said first identification data and said first key data with a second data set comprising a second identification data and a second key data stored in said RFID tag, and generates said access authentication data indicating an authentication for accessing said RFID tag when said first data set agrees with said second data set to transmit to said data processing terminal, by said RFID tag.

10. A computer program product embodied on a computer-readable medium and comprising code that, when executed, causes a computer to perform the following:

generating a first request signal for requesting a first key data by a data processing terminal, in response to a first identification data;

transmitting said first request signal to a memory medium by said data processing terminal;

generating a second request signal for requesting a second identification data and a second key data corresponding to said second identification data by said data processing terminal;

transmitting said second request signal to a radio frequency identification (RFID) tag by said data processing terminal;

comparing a first data set comprising said first identification data and said first key data received from said memory medium with a second data set comprising said second identification data and said second key data received from said RFID tag by said data processing terminal; and accessing said RFID tag when said first data set agrees with said second data set, and deleting said first key data, said second identification data and said second key data when said first data set does not agree with said second data set, by said data processing terminal.

* * * * *